United States Patent [19]

Scheifley et al.

[11] 4,195,596
[45] Apr. 1, 1980

[54] COMBUSTION OF HALOGENATED HYDROCARBONS

[75] Inventors: John C. Scheifley, Lake Jackson; Clark R. Shields, Angleton; David E. Busby, Lake Jackson, all of Tex.

[73] Assignee: The Dow Chemical Company, Midland, Mich.

[21] Appl. No.: 940,918

[22] Filed: Sep. 11, 1978

Related U.S. Application Data

[62] Division of Ser. No. 710,960, Aug. 2, 1976, Pat. No. 4,125,593.

[51] Int. Cl.$^2$ ............................................. F22B 7/12
[52] U.S. Cl. .................................... 122/149; 423/241
[58] Field of Search ................ 122/149, 150; 423/240, 423/210, 241, 481, 488, 522

[56] References Cited

U.S. PATENT DOCUMENTS

| | | | |
|---|---|---|---|
| 1,751,533 | 3/1930 | Taylor | 122/149 |
| 2,264,226 | 11/1941 | Toner | 122/149 |
| 2,888,910 | 6/1959 | Loebel | 122/149 |
| 2,892,451 | 6/1959 | Brown, Jr. et al. | 122/149 |
| 3,140,155 | 7/1964 | Call et al. | 423/481 |
| 3,232,280 | 2/1966 | Loebel et al. | 122/149 |
| 3,259,108 | 7/1966 | Craig et al. | 122/149 |
| 3,649,187 | 3/1972 | Fisher | 423/522 |
| 3,716,339 | 2/1973 | Shigaki et al. | 110/222 |
| 3,984,206 | 10/1976 | Winnen | 423/481 |

*Primary Examiner*—Edward G. Favors
*Attorney, Agent, or Firm*—W. J. Lee

[57] ABSTRACT

Halogenated hydrocarbon materials are burned in an internally-fired horizontal fire-tube boiler and the heat of combustion directly produces saturated steam. Halogen values may be recovered from the combustion gases, e.g., by being absorbed in water. Thus halogenated hydrocarbon material which may need to be disposed of, is beneficially converted to energy and useful product.

11 Claims, 3 Drawing Figures

_(page 1, col 1)_

COMBUSTION OF HALOGENATED HYDROCARBONS

CROSS-REFERENCE TO RELATED APPLICATION

This is a divisional application of Ser. No. 710,960 filed Aug. 2, 1976, now U.S. Pat. No. 4,125,593.

BACKGROUND OF THE INVENTION

It is ecologically unacceptable to release halogenated hydrocarbons into the atmosphere or into public waters. Among the methods used in attempts to abate such pollution has been combustion (thermal oxidation) of the halogenated hydrocarbons in bricklined furnaces or other refractory furnaces. There have been some attempts to extract some of the heat values and chemical values by heat exchange and aqueous scrubbing of the combustion gases which are emitted from the refractory furnace.

It is the field of thermal oxidation of halogenated hydrocarbons to which the present invention most closely pertains. More precisely, the invention pertains to thermally oxidizing halogenated hydrocarbons in such a manner that the heat of combustion and the halogen values in the combustion product are recovered, thus salvaging valuable energy and chemical values.

It is an object of the present invention to provide for improved disposal of halogenated hydrocarbons by employing thermal oxidation.

It is a further object to provide for combusting of halogenated hydrocarbons in such a manner that pollution of public waters and the atmosphere is abated.

It is also an object to provide for combusting of halogenated hydrocarbons in such a manner that valuable energy and chemical values are recovered.

Another object is to provide a horizontal fire-tube boiler which has been modified so as to withstand the highly corrosive gases from the thermal oxidation of halogenated hydrocarbons for extended periods of time.

These, and other objects, are attained by performing the combustion (thermal oxidation) of halogenated hydrocarbons in accordance with the present invention.

SUMMARY OF THE INVENTION

It has now been found, surprisingly and unexpectedly, that halogenated hydrocarbons can be burned, generally along with a supplemental fuel, directly in the water-cooled combustion chamber of a horizontal fire-tube boiler and that the intense corrosion of the water-cooled metal surfaces in contact with the hot combustion gases which one would expect to get are substantially avoided by carefully controlling the pressure of the saturated steam which is produced in the boiler. Corrosion of other boiler surfaces which are contacted by the hot corrosive gases, and which are not water-cooled, are either constructed of corrosion-resistant material, e.g. nickel or nickel alloy, or else are protected by insulation which keeps the metal surfaces in the desired temperature range at which corrosion is substantially minimized.

In its broadest sense the present invention comprises the combustion (thermal oxidation) of halogenated hydrocarbon fuels directly in a modified horizontal fire-tube boiler wherein the heat of combustion is transferred through the metal walls directly into water to make saturated steam and to substantially cool the combustion gases. Preferably, the combustion gases are then passed into contact with liquid-absorbents, e.g., water-scrubbers, to recover halogen values.

As used herein, the terms "halogenated hydrocarbon" and "halogenated hydrocarbons" refers to single chemical entities or to mixtures of various halogenated hydrocarbons. The halogenated hydrocarbons may be either liquid or gaseous or both.

DETAILED DESCRIPTION OF THE INVENTION

Halogenated hydrocarbons are thermally oxidized to gaseous products $CO_2$, $H_2O$, HX (X=halogen), and some free halogen by being burned in an excess of air in a horizontal fire-tube boiler in which water is directly heated to form useable saturated steam and, preferably, the halogen values are collected from the exit gases by an aqueous scrubber. The fire-tube boiler is substantially of a conventional design, but since such conventional fire-tube boilers are not normally intended for use with highly corrosive fuels, it has been found to be advantageous to employ corrosion resistant surfaces at certain places in the boiler. The fire-tube boiler comprises, basically, a boiler section, a front-end section, and a rear section. The boiler section is essentially a horizontally-positioned shell and tube heat-exchanger. This heat-exchanger comprises a shell having its ends closed with tube-sheets. Extending between and communicating through the tube-sheets are a plurality of tubes. One of the tubes is a relatively large-diameter tube, herein called combustion chamber or furnace, and a plurality of smaller tubes, herein called return-tubes.

The front-end section, sometimes referred to in the industry as a front-end door or front door, can, conveniently, be swung open or removed, even partly, to expose the front tube-sheet of the boiler section and allow inspection or maintenance to be performed. The front-end section contains the feed means for transmitting air, supplemental fuel, and halogenated hydrocarbon fuel into the burner which is positioned at about the front-end of the combustion tube. The front-end section may contain baffles, as needed, to cause flow of hot gases entering it to flow back through the fire-tube boiler through a different set of return-tubes.

The rear section which, conveniently, can be swung open, may also contain baffles, as needed, to cause the flow of hot gases to flow back through the fire-tube boiler through a different set of return-tubes. The rear section may, conveniently, contain one or more ports or sight glasses for inspection or observation purposes. The inner surfaces of the rear section may be lined with a refractory material or other such insulation which will help prevent heat losses and help protect the metal from the hot, corrosive gases. Optionally, the rear section may be water-cooled by having water circulate between an inner wall and the outer wall or by having water flow through tubes which are juxta-positioned with the inside of the rear section wall.

Operation of the process is performed by mixing air, supplemental fuel (as needed), and halogenated hydrocarbon to provide a combustible mixture to the combustion chamber. The mixture is then burned in the combustion chamber. The ratio of supplemental fuel/halogenated hydrocarbon is adjusted to maintain flame stability and high halogen conversion to HX. The amount of supplemental fuel can vary from 0 to about 95% of the total heat input, depending on the heating value and the uniformity of the halogenated hydrocarbon which is being burned. The higher the heating value of the halogenated hydrocarbon, the less supplemental fuel is needed.

The water flow through the fire-tube boiler is adjusted to maintain a water level covering all the tubes; it is critical to keep all the tubes submerged to prevent their overheating. It has been found that corrosion is held to a surprisingly low minimum by operating in a manner to produce saturated steam at a pressure in the range of about 150 to about 275 psig., even when the fire-tube boiler is constructed of relatively inexpensive metals, such as carbon steel which is commonly and conventionally used to construct ordinary boilers. In this steam pressure range, the water in the boiler is maintained at a temperature in the range of about 186° to about 210° C. and this, along with maintaining scale-free metal surfaces on the water side of the boiler, keeps the walls of the furnace, return-tubes and tube-sheets which are exposed to the hot corrosive gases, at about 200° C. to about 250° C. If the steam pressure is allowed to drop below about 150 psig the walls of the furnace, return-tubes, and tube sheets can cool down to the point (downwards from 200° C.) at which accelerated corrosion is encountered. On the other hand, if the pressure is allowed to climb upwards much above 275 psig, the walls of the furnace, return-tubes, and tube-sheets can approach 300° C. or more (especially if any scale has formed) and severe corrosion may be encountered.

It is essential that care be taken to assure that the water in the boiler be non-scale-forming so as to substantially avoid formation of scale on the water side of the return-tubes, tube-sheets and combustion chamber. If significant amounts of scale accumulate on these surfaces, heat transfer through these metal walls is adversely affected and the resulting higher wall temperature on the combustion gas side of the walls will cause severe corrosion rates. Persons skilled in the art of boiler water control are aware of the various water treatments which are customarily used for prevention of scale. The exact nature of any scale-inhibitors or other means used for avoiding scale formation is not especially critical. Obviously, ingredients in the water which are corrosive or will cause substantial oxidation of the metal surfaces should be avoided or inhibited.

The expression "fire-tube boiler" as used herein refers to commonly used and well-known boilers which have water-cooled combustion chambers and which are called "stationary, horizontal, internally-fired, fire-tube boilers." These boilers are available commercially and can be built, or modified, to be multi-pass, e.g., two-pass, three-pass, four-pass, or more passes. The expression "pass" refers to the travel of the combustion gases through one or more tubes in one direction; a second "pass" occurs when the hot gases travel in the reverse direction through one or more other tubes. In multiple-pass boilers, the flow of gases in each "pass" is through one or more tubes not used in another "pass".

Figure 1:
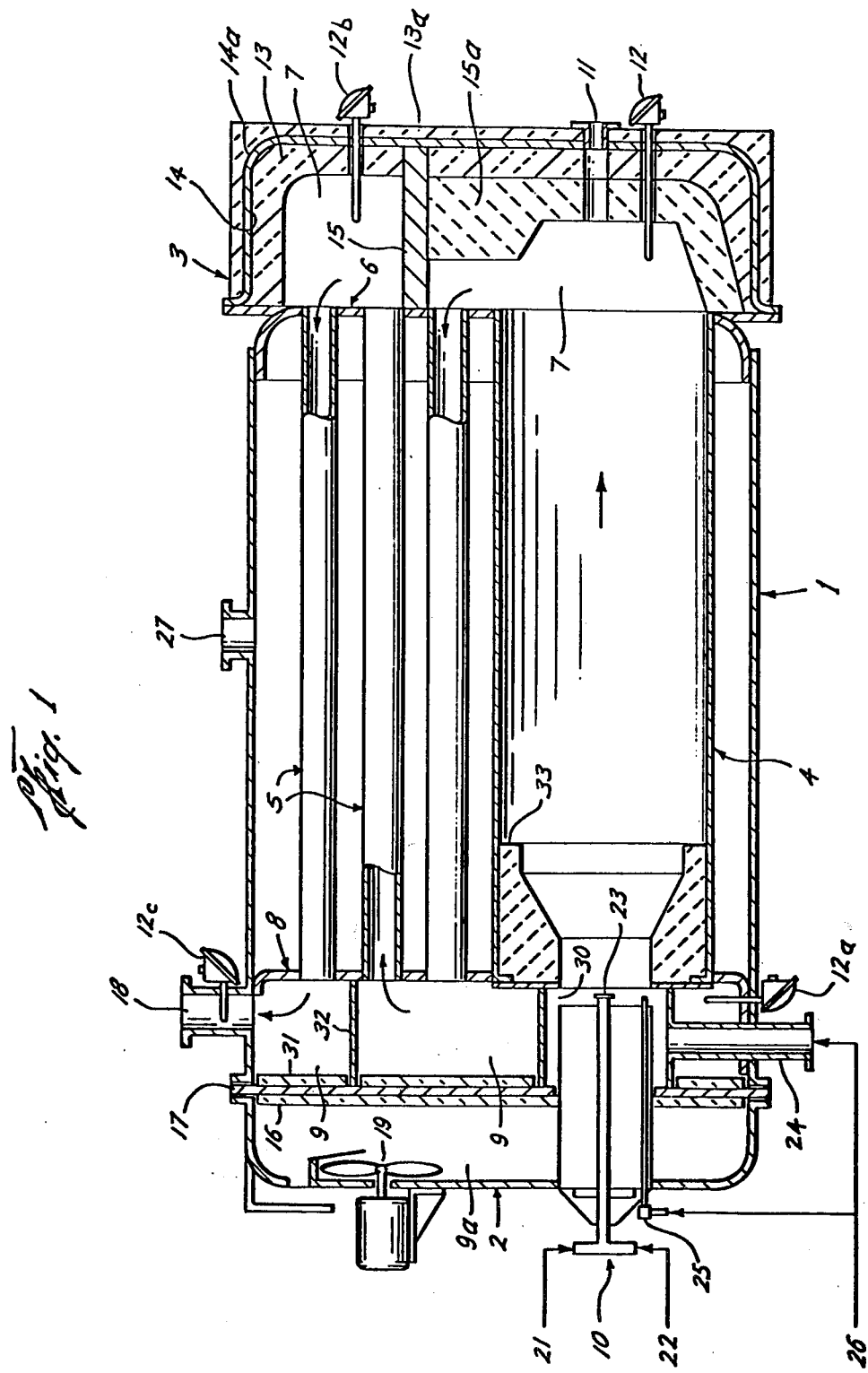
FIG. 1 depicts a cross-section view, not to scale, showing the principal features of a horizontal fire-tube boiler.

A common embodiment of a fire-tube boiler, modified according to the present invention, is defined, generally, by reference to FIG. 1 which is a cross-sectional view depicting the essential main parts of the boiler, as a boiler having a boiler section (1), a front-end section (2), and a rear section (3). The boiler section comprises a horizontal combustion chamber (4) in parallel alignment with a plurality of return-tubes (5), said combustion chamber and return-tubes being positioned within said boiler section, terminating at the tube-sheets (6) and (8) at the ends of the boiler section and communicating with the space contained within (3), said space within (3) being designated as (7). The other ends of the return-tubes and combustion chamber terminate at tube-sheet (8) and communicate with the space contained within (2) said space within (2) being designated, generally, as (9). A supplemental fuel, air, and halogenated hydrocarbon feeder device (denoted generally as 10) communicates from the supplemental fuel, air, halogenated hydrocarbon supply lines through front end section (2) and through space (9) into combustion chamber (or furnace) (4). Conveniently, there is a sight glass (11) through rear section (3) which allows one to observe the burning in the combustion chamber. Also, conveniently, there is a thermocouple (12) protruding through rear section (3). The interior wall surface (14) of rear section (3) is conveniently lined with refractory material or high-temperature insulation (13). The external wall surface (14a) may be water-cooled by, e.g., water conduits (not shown) or may be protected against the vagaries of weather and against loss of heat by refractory or insulation material (13a). The wall defining section (3) should be protected against contact with corrosive agents, e.g., HCl. Preferably the amount of insulation used at (13) and (13a) is selected on the basis of keeping the wall in the range of about 200° C. to about 250° C. during the combustion of halogenated hydrocarbon. The space within rear section (3), which is designated as (7) may be divided into two or more separate spaces, if desired, by using one or more corrosion-resistant baffles (15) which direct flow of hot gases back through return-tubes not yet traveled. In space (7), at the area at which hot combustion gases from the combustion chamber impinge on the inner surface of the insulation or refractory (13), there is preferably installed a corrosion-resistant material (15a) which is selected for its ability to withstand hot, corrosive material over a substantial length of time and also to help in avoiding heat losses. Many refractories are known which will withstand the hot, corrosive gases encountered in the present invention.

Within section (2) there may be, if desired, one or more baffles (32) to direct the flow of hot gases through the appropriate return-tubes. The space within section (2) may be divided into two major spaces (9) and (9a) by the use of a barrier wall (17) having a corrosion-resistant or insulated surface (31) and an insulated surface (16) which serve to keep the wall (17) in the desired temperature range during operation. The inner major space (9), which may contain one or more baffles (32) carries the hot gases which flow from space (7) until the gases eventually flow from the exit (18) provided and on to further processing. Depending on the number of passes, exit (18) may communicate with space (7) instead of space (9). The feeder device (10) communicates through spaces (9a) and (9) into the combustion chamber (4). The space within the feeder device does not communicate directly with space (9). Passages (not shown) in the walls of the feeder device receive air from space (9a). Air may be supplied to space (9a) by means of forced air (19) or by being drawn in with induced draft attained by drawing exit gases out through exit (18). Damper means (not shown) may be employed on the feeder device (10) to regulate the amount of air reaching the burner.

In one embodiment of an actual operation atomizing air (21) and halogenated hydrocarbon (22) are mixed in a feed line approximately centrally located within feeder device (10) and are thereby supplied to the atomizing nozzle (23) of the feeder device. Supplemental fuel gas (26) is fed to the pilot (25) and/or through the vapor inlet pipe (24) and through openings (30) where it mixes with air (19) in the region of the nozzle (23). Chlorinated hydrocarbon vapors may also be conveniently fed to the burner through pipe (26). The mixture of air, fuel and halogenated hydrocarbon is mixed and burned in combustion chamber (4), the hot gases passing into one portion of space (7), then through a plurality of return-tubes (5) to one portion of space (9), then through a plurality of return-tubes (5) into another portion of space (7), then back to another portion of space (9) where it then exits (18) the boiler into other processing equipment (not shown in FIG. 1). During operation non-scaling water is supplied to the boiler so as to completely surround the return-tubes and the combustion chamber. The combustion is regulated by adjusting the flow of fuel and/or air so as to maintain excess oxygen in the exit gases and to keep the temperature of the gases leaving the combustion chamber space near thermocouple (12) at not more than about 1100° C. and to maintain a saturated steam pressure in the range of about 150 to about 275 psig which gives a boiler water temperature in the range of about 186° to about 210° C. The desired water level is maintained by regulating the flow of make-up water. The desired pressure is maintained by regulating the flow of saturated steam from the boiler at steam vent (27) and/or by regulating the fuel mixture being fed to the combustion chamber.

Figure 2:
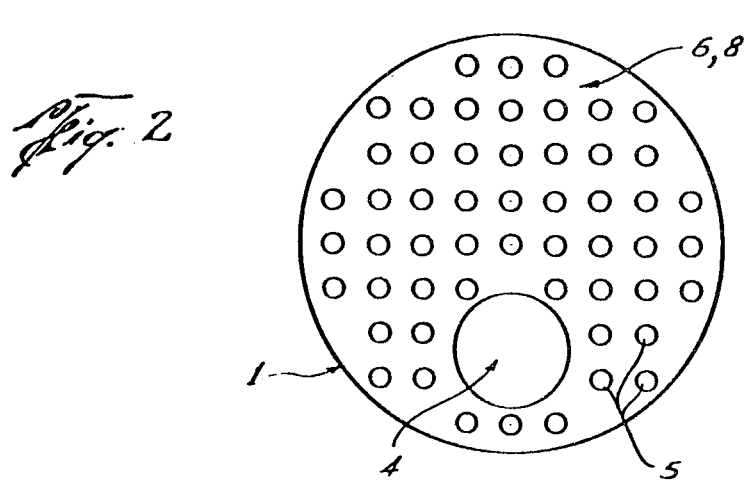
FIG. 2 depicts an end-view, not to scale, of a fire-tube boiler tube-sheet with end views of the combustion chamber and return tubes depicted.

FIG. 2 depicts an end-view of a fire-tube boiler section (1) and shows a plurality of return-tubes (5) communicating through tube-sheet (6) or (8). Combustion chamber (4) is considerably larger in diameter than the return-tubes.

Even though combustion chamber (4) is depicted as a straight-wall tube, practitioners of the art of fire-tube boilers will realize that the combustion chamber walls may be convoluted.

It will also be readily apparent that the positioning of baffles (15) and (32) should be done commensurately with the contracting volume of the gases as they cool during flow through the return-tubes. That is, the total cross-sectional area of the first "set" of return-tubes should be less than the cross-sectional area of the combustion chamber; the second "set" of return-tubes should have a total cross-sectional area less than the first "set" and so on. Thus, the gas velocity from one "pass" to another is kept high so as to keep heat transfer rates efficient.

In a typical operation in the depicted apparatus, the temperature profile in a boiler such as depicted in FIG. 1 will be: about 2100°–1600° C. (average) in the combustion chamber (4); about 500°–1100° C. in the area of thermocouple (12); about 280°–400° C. in first space (9), measured by thermocouple (12a); about 250°–320° in space (7), measured by thermocouple (12b); and about 215°–260° C. in second space (9), mesured by thermocouple (12c) as the gases leave through exit (18).

Figure 3:
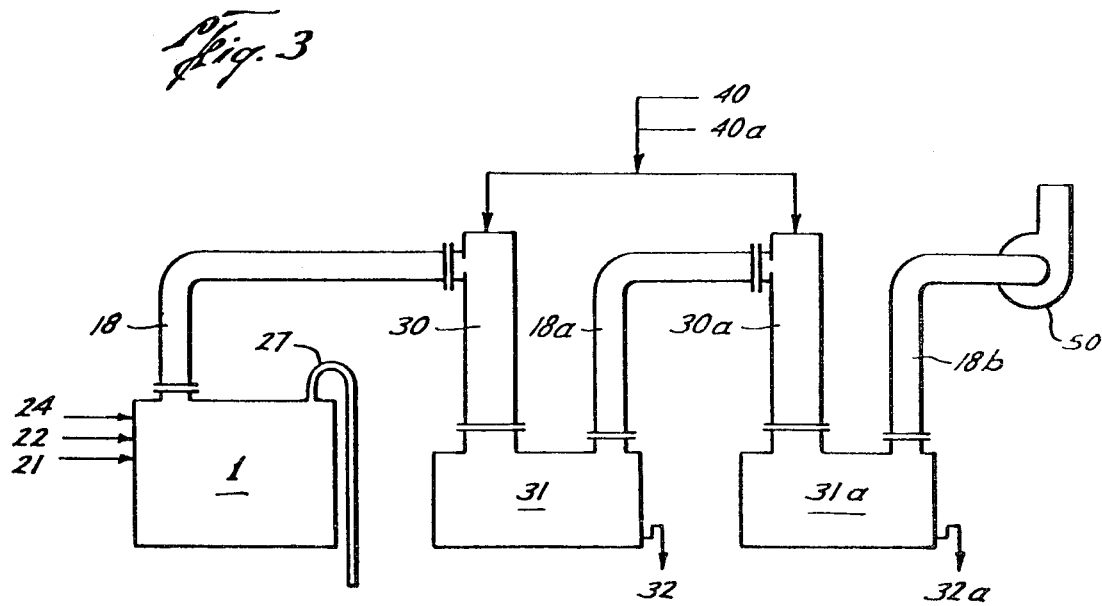
FIG. 3 is a flow-sheet diagram, not to scale, showing a generalized view of a fire-tube boiler and two scrubbing units, with appropriate piping, for halogen recovery.

FIG. 3 is a flow-sheet diagram depicting an embodiment of the overall process wherein supplemental fuel (24), air (21) and halogenated hydrocarbon (22) are burned in a fire-tube boiler (1), combustion gases which exit are carried by conduit (18) to a liquid-contactor, e.g., an aqueous scrubber (30), through a separator (31) from which aqueous solution is drawn (43), then through conduit (18a) to a second aqueous scrubber (30a), on through a second separator (31a) from which aqueous solution is drawn (32a), then through a conduit (18b) to a vent or other suitable processing. Water (40) and/or other appropriate aqueous scrubbing liquid, e.g., dilute caustic (40a) is supplied to scrubbers (30) and (30a) and aqueous solution is drawn from the separators at a rate commensurate with the flow of aqueous solution from the scrubbers. A blower or other appropriate gas-moving device (50) may be conveniently employed to enhance the flow of the combustion gases through the system and to safeguard against leaks of corrosive materials from the system in the event a leak occurs. By pulling the combustion gases through the system, a positive pressure is avoided, and in fact, a slightly reduced pressure within the system may be attained. Steam exits the boiler through vent (27) and is used elsewhere.

The supplemental fuel used in the burning process may be any of the lower hydrocarbons ordinarily employed as fuels, such as, methane, ethane, propane, butane, isopropane, isobutane, pentane, hexane, heptane, octane, isoctane or mixtures of these or may be L.P.G. (liquified petroleum gas). Any aliphatic hydrocarbon having 1–12 carbons, especially 1–4 carbons, are suitable. The most ordinary fuel and most preferred as supplemental fuel, is natural gas. Virtually any vaporizable or atomizable hydrocarbon may be employed, such as gasoline, kerosene, petroleum ether, fuel oil, No. 2 fuel oil, No. 4 fuel oil, Bunker C oil, etc. Clean-burning fuels or clean-burning mixtures of fuels are preferred.

The "halogenated hydrocarbon" as used herein includes hydrocarbons which have chlorine, bromine, or iodine values. Usually the halogenated hydrocarbon desired to be burned according to the present invention is a waste stream of chlorinated hydrocarbon or mixture of chlorinated hydrocarbons. It is within the purview of the present invention to combine various streams containing chlorinated, brominated, or iodinated organics for burning. Fluorinated organics may also be mixed in for burning, but since fluorine values are normally so highly corrosive as to substantially limit the life of the equipment, it is best to hold the maximum amount of organic fluorides to a small percent. The present invention also contemplates that the air supplied to the burner may contain vapors of halogenated hydrocarbons, such as vinyl chloride and others, which may be swept from an area for protection of personnel in the area.

The following examples are meant to illustrate operation of some embodiments of the present invention. The scope of the invention is restricted only by the attached claims.

EXAMPLES

Various halogentaed hydrocarbons were burned in a 4-pass fire-tube boiler substantially in accordance with the above teachings. The data are shown in Table I. The supplemental fuel was natural gas. The calculated average temperature in the furnace was the arithmetic average of measured outlet temp. and theoretical flame temperature, based on the measured temperature at the thermocouple (12) positioned at the end of the first pass. The steam pressure was maintained in the range of It will be readily apparent to persons skilled in the art that other embodiments and modifications in the process and in the apparatus may be made without departing from the present invention.

TABLE I

| Run No. | RCL Feed Stream | Feed to Boiler Lb./Hr. RCL | Feed to Boiler Lb./Hr. CH₄ | Calc. Ave. Temp. (°C.) | T.C.* Temp. (°C.) | Residence Time (Sec.) | RCL in Outlet Gas (wt. ppm) | RCL Conversion (%) | Chlorine Conversion To HCl (%) |
|---|---|---|---|---|---|---|---|---|---|
| 1 | A | 66.5 | 9.6 | 1361 | 870 | 0.36 | 0.083 | 99.99++ | 97.9 |
| 2 | B | 74.0 | 17.0 | 1327 | 888 | 0.27 | 0.076 | 99.99++ | 98.9 |
| 3 | B | 64.8 | 17.3 | 1312 | 870 | 0.28 | 0.128 | 99.99++ | 98.9 |
| 4 | C | 88.0 | 8.5 | 1423 | 1050 | 0.24 | 0.234 | 99.99++ | 98.4 |
| 5 | C | 101.5 | 6.0 | 1374 | 990 | 0.22 | 0.203 | 99.99++ | 98.3 |
| 6 | D | 159.4 | 14.7 | 1291 | 790 | 0.33 | 8.06 | 99.99++ | 93.4 |
| 7 | D | 100.0 | 31.7 | 1339 | 875 | 0.24 | 1.57 | 99.99++ | 97.7 |
| 8 | E | 67.3 | 34.0 | 1293 | 837 | 0.25 | 1.13 | 99.99++ | NA** |
| 9 | E | 67.3 | 34.0 | 1293 | 837 | 0.25 | 0.53 | 99.99++ | NA |
| 10 | F | 96.6 | 19.1 | 1333 | 923 | 0.26 | 8.8 | 99.99++ | NA |
| 11 | F | 96.6 | 19.1 | 1333 | 923 | 0.26 | 1.98 | 99.99++ | NA |
| 12 | G | 75.1 | 26.4 | 1362 | 945 | 0.29 | 14.7 | 99.98++ | 99.3 |

*T.C. Temp. is measured by the thermocouple at end of first pass.
**NA: Not Analyzed about 150 to about 275 psig and the water in the boiler was in the range of about 186° C. to about 210° C. The water level was maintained so as to completely cover the uppermost return-tubes. During operation a blower at the vent stack operated to pull excess air through the burner, through two aqueous caustic scrubbers in series and out through the vent stack.

The RCl's (halogenated hydrocarbons) in the vent gas were determined by entrapment in heptane followed by electron capture gas chromatography analysis except for Run Nos. 9, 11, and 12. Run Nos. 9 and 11 were determined by total organic chloride analysis of RCl's trapped in heptane and Run No. 12 was determined by trapping RCl's on activated charcoal, extracting with carbon disulfide and analyzing by hydrogen flame gas chromatography.

The RCl feed streams in Table I are identified as follows (percents are by weight):

A. Commercial grade propylene dichloride.
B. Waste mixture of about thirty different RCl's with elemental analysis of 32.8% C, 63.2% Cl, 4.0% H.
C. Waste mixture of 6 RCl's containing mostly dichloroisopropyl ether with elemental analysis 40.2% C, 43.6% Cl, 6.7% H, 9.5% O.
D. Waste mixture of about 23 RCl's containing mainly trichloroethane, trichlorobromopropane, and pentachloroethane; also contained hexachloroethane, hexachlorobutane, hexachlorobutadiene and had elemental analysis 17.2% C, 77.1% Cl, 4.6% H, 1.1% Br.
E. Waste mixture of about 13 RCl's containing mainly hexachlorobutadiene and symmetrical tetrachloroethane; also contained hexachloroethane and hexachlorobenzene and had elemental analysis of 17.5% C, 81.6% Cl, 0.9% H.
F. Waste mixture of about 14 RCl's containing mainly propylene dichloride, hexachloroethane, sym-tetrachloroethane; also contained hexachlorobenzene and had elemental analysis 24.5% C, 72.3% Cl, 3.2% H.
G. Waste mixture of about 5 RCl's containing mainly sym-tetrachloroethane, hexachloroethane, hexachlorobutadiene; 1.9 wt. % iron as Fe, 2.7 wt. % ash at 950° C.; elemental analysis 15.61% C, 82.96% Cl, 1.46% H.

We claim:

1. A water-cooled, horizontal fire-tube boiler having a front end section, a boiler section, and a rear end section, which comprises in combination a boiler section comprising a generally cylindrically-shaped shell having a vertically-disposed metal tube-sheet at each end, a relatively large metal combustion chamber tube extending the length of, and within, said shell and communicating through said tube-sheets, a plurality of relatively small metal return-tubes extending the length of, and within, the boiler shell and communicating through said tube-sheets, the combustion chamber tube and the return-tubes being in spaced-apart, horizontal relationship, a front end section comprising a confined space for containing combustion gases, said space communicating with said return-tubes, and having feed means extending through said confined space for feeding air, supplemental fuel, and halogenated hydrocarbons into a burner nozzle within the combustion chamber tube, a rear end section comprising a confined space for containing combustion gases, said space communicating with said combustion chamber tube and said return-tubes, the spaces contained within the front end section and the rear end section having those surfaces, except for the tube-sheet surfaces, which are exposed to the combustion gases when the boiler is in operation, made of corrosion-resistant material or covered with an amount of insulation predetermined to maintain the temperature of such surfaces within a predetermined temperature range during operation, a means for supplying water into the shell, a means for controlling steam pressure in the range of about 150 to about 275 psig and for removing steam from the top of the shell, and a means for removing combustion gases from one of the end sections.

2. The horizontal fire-tube boiler of claim 1 wherein one or more corrosion-resistant baffles are employed in one or both end sections to divide the spaces within the end sections into two or more spaces which do not communicate directly with each other, each of said spaces communicating with the tubes in the boiler, thereby providing a fire-tube boiler of more than two passes.

3. The horizontal fire-tube boiler of claim 1 wherein the corrosion-resistant material is nickel or an alloy of nickel.

4. The boiler of claim 1 wherein the predetermined temperature is within the range of about 200° C. to about 250° C.

5. The boiler of claim 1 wherein the insulation is a refractory material.

6. The boiler of claim 1 wherein the boiler section contains water, at about 186° C. to about 210° C., in an amount sufficient to cover the combustion tube and the return-tubes, an amount of steam in the boiler section which is at a pressure of about 150 to about 275 psig, and a conflagrant mixture in the combustion chamber comprising oxygen and halogenated hydrocarbon.

7. The boiler of claim 6 wherein the conflagrant contains air as the oxygen source and contains a supplemental hydrocarbon fuel.

8. The boiler of any one of claims 1, 2, 3, 4, or 5 wherein the boiler section contains water, at about 186° C. to about 210° C., in an amount sufficient to cover the combustion tube and the return-tubes, an amount of steam in the boiler section which is at a pressure of about 150 to about 275 psig, and a conflagrant mixture in the combustion chamber comprising air, halogenated hydrocarbon, and supplemental fuel.

9. A method for modifying a water-cooled, horizontal, fire-tube boiler built of carbon steel in which hot combustion gases are intended to come in contact with wall surfaces which are cooled by water on their reverse side and with wall surfaces which are not cooled by water on their reverse side, the said method comprising, lining the said wall surfaces which are not cooled by water on their reverse side with a predetermined amount of insulation material which prevents a large $\Delta T$ through said wall so as to maintain the wall surface which is intended to be contacted with hot combustion gases in the temperature range of about 200°–250° C. when the fire-tube boiler is in operation.

10. An improved horizontal fire-tube boiler, suitable for use for burning halogenated hydrocarbons, said boiler being built of carbon steel and having wall surfaces which are contacted by hot combustion gases and which are cooled by water or their reverse side, and wall surfaces which are not cooled by water on their reverse side, said improvement comprising, a predetermined amount of insulation covering the walls which are not cooled by water on their reverse side, to maintain said walls in the temperature range of about 200° C. to about 250° C. when the fire-tube boiler is in operation.

11. A process for generating saturated steam which process comprises thermally oxidizing halogenated hydrocarbons in the combustion chamber of a water-cooled, horizontal fire-tube boiler to produce heat and combustion gases, wherein heat produced is conducted directly through the tube walls into water which surrounds the tubes, said process being characterized by the saturated steam pressure being maintained in the range of about 150 to about 275 psig thereby maintaining the temperature of the water in contact with the tube walls in the range of about 186° C. to about 210° C.

* * * * *